Patented Mar. 23, 1926.

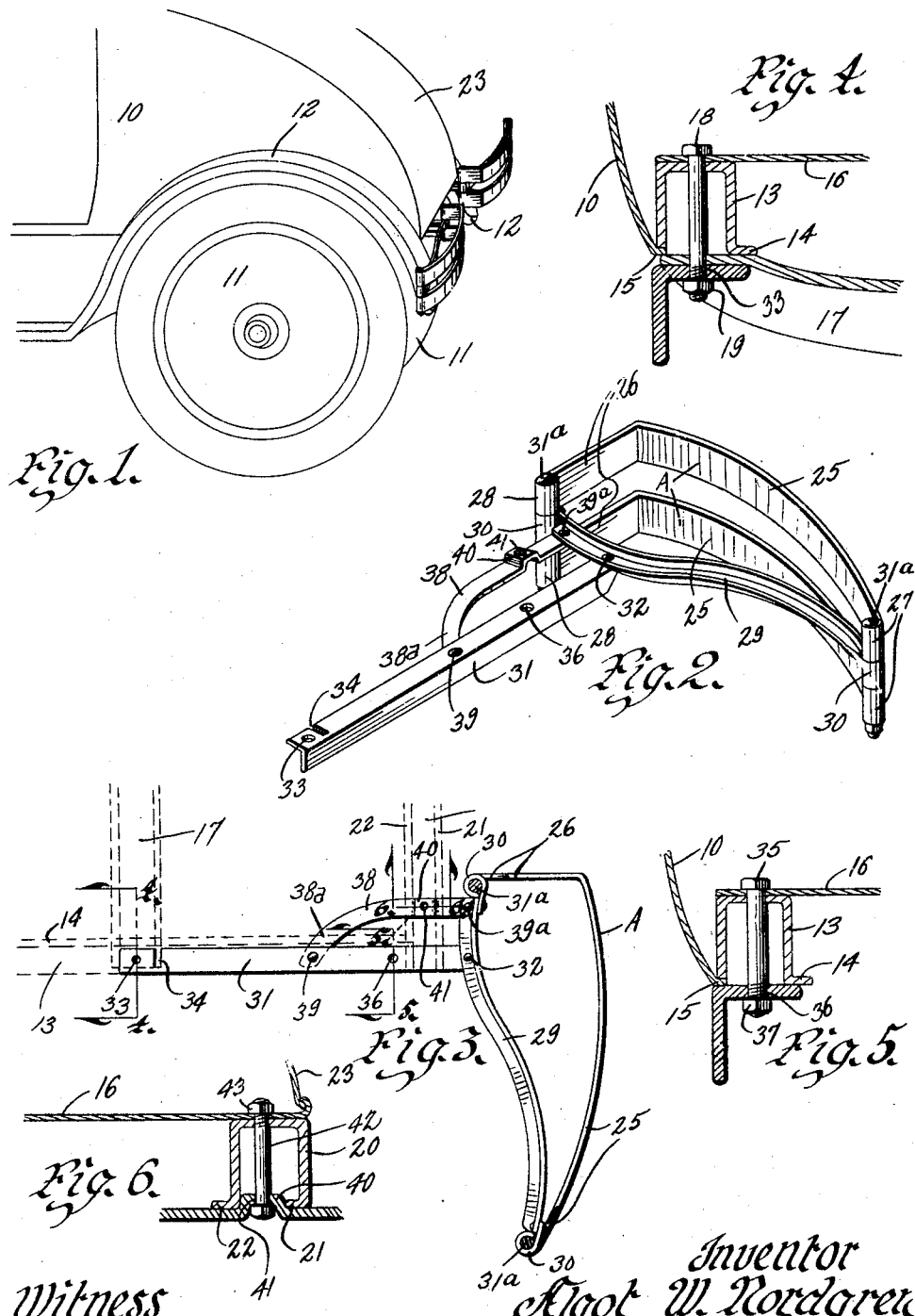

1,578,085

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

FENDER GUARD AND SUPPORT.

Application filed December 4, 1925. Serial No. 73,127.

*To all whom it may concern:*

Be it known that I, ALGOT W. NORDGREN, a citizen of the United States, and a resident of St. Paul, in the county of Ramsey and State of Minnesota, have invented a certain new and useful Fender Guard and Support, of which the following is a specification.

The object of my invention is to provide a fender guard and support of the type in which separate fender guards are mounted on opposite sides of a motor vehicle for protecting the fenders.

It is particularly my purpose to provide a fender guard and support therefor, whereby the fender guard may be rigidly supported against any blows or strains to which the fender guard may be subjected in use.

Still another purpose is to provide in such a structure a fender guard having a supporting member connected therewith and adapted to be supported on the longitudinal frame member of a motor vehicle at a plurality of points thereon, combined with a supporting element connected at one end with the fender guard and at the other end with the supporting member and intermediate of its ends with a transverse member of the car, whereby a maximum strength and rigidity may be afforded.

With these and other objects in view, my invention consists in the construction, arrangement and combination of the various parts of my fender guard and support, whereby the objects contemplated are attained, as hereinafter more fully set forth, pointed out in my claims, and illustrated in the accompanying drawings, in which:

Figure 1 is a perspective view of a part of a motor vehicle equipped with fender guards and supports embodying my invention.

Figure 2 is a perspective view of one of my improved fender guards and supports.

Figure 3 is a horizontal, sectional view of the portion of the car body frame with my improved fender guard and support installed thereon.

Figure 4 is a vertical, sectional view taken on the line 4—4 of Figure 3.

Figure 5 is a vertical, sectional view taken on the line 5—5 of Figure 3; and

Figure 6 is a vertical, sectional view taken on the line 6—6 of Figure 3.

In the accompanying drawings in which there is illustrated a form in which my invention may be embodied, the reference numeral 10 indicates the body of a motor vehicle, for example a Ford automobile.

The motor vehicle has the wheels 11 and the ordinary fenders 12. It also has the longitudinal frame members 13.

The frame members 13 have at the lower edges of their inner flanges the laterally projecting flanges 14 at the sides of the body 10, preferably inclined to the lower edges of the outer flanges or walls of the members 13 on each side of the machine, and provided at their lower edges with in-turned flanges 15 resting just below the flanges of the channel frame members 13.

The floor 16 of the car body rests on the channel-shaped frame members 13.

In the ordinary Ford, the transverse hanger frame member 17 comprising a downwardly opening channel is bolted to the under side of the frame member 13 and to the floor 16 by means of a bolt 18 and nut 19.

At the rear of the car is another transverse frame member comprising the downwardly opening channel 20 having at the lower edges of its walls the forwardly projecting flanges 21 and 22.

The floor 16 rests on the transverse frame member 20 and the back 23 of the body 10 is connected with the rear edge of the floor as shown in Figure 6.

My improved fender guard is similar to that shown in my prior application, Serial No. 64,912, filed October 26, 1925, and comprises a pair of vertically spaced spring steel bumpers indicated generally by the reference character A.

Each of these bumpers comprises a rear curved portion 25 arranged to stand just beyond the end of the fender and a portion 26 projecting from the inner end of the portion 25 toward the car.

The free ends of the portions 25 and 26 of each bumper A are formed into eyes 27 and 28.

The ends of the spring bumper members A are connected together and held spaced apart by a rigid T-iron member 29, which is reversibly curved, as shown in Figure 2, and has the eyes 30 at its ends arranged between the eyes of the respective spring bumper members A.

Bolts 31 are extended through the eyes 28 and 30 and the eyes 27 and 30.

Secured to the rigid T-iron member 29 spaced from the eyes 28 but substantially nearer those eyes than to the eyes 27 is an angle iron supporting member 31, having its upper horizontal flange pivoted or bolted as at 32 to the horizontal flange of the T-iron members 29 and arranged with its other flange extending downwardly as shown in Figure 2.

Assuming that the parts are described as installed at the rear of the car, it will be seen that the supporting member 31 extends forwardly from the fender guard.

It is provided at its front end in its horizontal flange with a hole 33 and near that hole with a notch 34. The nut 19 heretofore referred to is removed and the supporting member 31 is installed in position with the lower end of the bolt 18 inserted through the hole 33 and with the rearward flange of the transverse member 17 received in the notch 34 and with the forward end of the member 31 abutting the forward flange of the transverse member 17.

The floor 16 and the frame member 13 and the supporting member 31 are secured together by means of a bolt 35, which is extended through a hole 36 in the horizontal flange of the member 31 and by a nut 37.

Thus it will be seen that the member 31 is rigidly secured to the longitudinal frame member 13 of the car at points spaced substantially apart, so that the connection is strong and rigid.

I further provide a supporting element comprising a heavy piece of strap iron 38 having its rearward end riveted or bolted to the T-iron member 29 as at 39 adjacent to the inner ends of the spring bumper members and between said inner ends and the bolt 32.

The supporting element 38 extends from the T-iron member 29 rearwardly and is then curved laterally as at 38ª and bolted as at 39ª to the horizontal flange of the supporting member 31.

Intermediate of its ends, the supporting element 38 is formed with a short portion 40 pressed upwardly, so as to fit between the flange 21 and the forward vertical flange of the transverse member 20, as shown in Figure 6.

In the portion 40, which thus appears to be U-shaped in longitudinal cross section, is a hole 41. A bolt 42 is extended through the hole 41 and through the transverse frame member 20 and through the floor 16 and has a nut 43 for rigidly connecting the supporting element 38 with the transverse frame member 20.

It will thus be seen that I have provided in the supporting element 38 a further means for rigidly supporting the fender guard on the body of the car, to-wit, on the transverse frame member 20 and connecting it with the supporting member 31.

The supporting element 38 is rigidly connected with the transverse frame member 20 between its ends and supports the fender guard member 29 at one end and is braced on the supporting member 31 at the other end, so as to form a strong, unitary, rigid support, with a minimum number of connecting bolts or rivets.

This is important in producing a neat job with standard materials, such as the T-iron 29. The T-iron 29 gives a maximum of strength, but affords only a narrow flange for the fastening of the supporting member 31 and the supporting element 38.

The member 31 and the element 38 are preferably secured to the T-iron member 29 with single rivets or bolts as shown.

The element 38 is secured to the transverse frame member of the car by a single bolt and yet by connecting the forward end of the element 38 with the member 31, the rigid frame structure is secured.

Thus a forward impact or blow on the outer end of the spring bumper members will be transmitted to the member 31 and yet will be distributed by the arrangement and construction of the member 38 in such manner as to be least likely to bend the member 31.

A study of the device herein shown shows that it will withstand a maximum of all sorts of strains imposed from various directions with a minimum of injury to the fender guard and support and to the car.

Some changes may be made in the details of my improved structure of which I have assumed to show only a desired form, and it is my intention to cover by my claims, any modifications in structure or arrangement in parts or use of mechanical equivalents, which may be properly included within the scope of my invention and of such claims.

I claim as my invention:

1. In a device of the class described, a fender guard support comprising a member adapted to support a fender guard, and to be secured to a vehicle frame, and a supporting element adapted to have its intermediate portion secured to a vehicle frame and its ends secured respectively to the said member and to a fender guard.

2. In a device of the class described, a fender guard support comprising a member adapted to support a fender guard and to be secured to a longitudinal member of a vehicle frame, and a supporting element adapted to have its intermediate portion secured to a transverse member of a vehicle frame and its ends secured respectively to the said member and to a fender guard.

3. In a device of the class described, a fender guard support comprising a member adapted to support a fender guard, and to be secured to a vehicle frame, and a supporting element having a raised intermediate portion adapted to be secured to a vehicle frame and its ends secured respectively to the said member and to a fender guard.

4. In a device of the class described, a fender guard support comprising a member adapted to support a fender guard and to be secured to a vehicle frame, a supporting element adapted to have its intermediate portion secured to a vehicle frame and its ends secured respectively to the said member and to a fender guard, and a fender guard secured to the ends of said member and element.

5. In a device of the class described, a fender guard support comprising a member adapted to support a fender guard and to be secured to a longitudinal member of a vehicle frame, a supporting element adapted to have its intermediate portion secured to a transverse member of a vehicle frame and its ends secured respectively to the said member and to a fender guard, and a fender guard secured to the ends of said member and element.

6. In a device of the class described, the combination of a vehicle having longitudinal and transverse frame members, with a fender guard and support comprising a supporting member secured to a longitudinal frame member and at one end to the fender guard, a supporting element secured at one end to the fender guard and at the other end to the supporting member, and at its intermediate portion to a transverse frame member.

7. In a device of the class described, the combination of a vehicle having a longitudinal frame member and a channel-shaped transverse frame member, with a fender guard and support comprising a supporting member secured to the longitudinal frame member and at one end to the fender guard, a supporting element secured at one end to the fender guard and at the other end to the supporting member, and having at its intermediate portion an upwardly bent U-shaped part received in and secured to the transverse member.

8. The combination of a vehicle frame with a bumper, having a spring member, a rigid member connecting the ends of the spring member, a bumper support comprising a supporting member, connected with the rigid member and adapted to be supported on an automobile frame and a brace connecting said rigid member and said supporting member and connected between its ends with said frame.

9. In a device of the class described a pair of curved vertically spaced spring bumper elements, a rigid connecting member pivoted to the ends of the bumper elements, and supporting members connected with said rigid member at substantially spaced points.

Des Moines, Iowa, November 27, 1925.

ALGOT W. NORDGREN.